United States Patent
Hessler et al.

(10) Patent No.: US 6,807,152 B1
(45) Date of Patent: Oct. 19, 2004

(54) ENHANCED MULTIFRAME PROCESSING FOR TANDEM CONNECTION TRAILS WITH TRANSMISSION PROTECTION SCHEMES

(75) Inventors: Peter Hessler, Bavaria (DE); Manfred Alois Loeffler, Igensdorf (DE); Jurgen Leonhard Milisterfer, Rosstal (DE); Maarten Petrus Joseph Vissers, Huizen (NL)

(73) Assignee: Lucent Technologies Inc., Murray Hill, NJ (US)

( * ) Notice: Subject to any disclaimer, the term of this patent is extended or adjusted under 35 U.S.C. 154(b) by 786 days.

(21) Appl. No.: 09/655,250

(22) Filed: Sep. 5, 2000

(30) Foreign Application Priority Data

Sep. 7, 1999 (EP) .............................. 99307111

(51) Int. Cl.[7] .................. G01R 31/08; G06F 11/00; G08C 15/00
(52) U.S. Cl. ...................... 370/242; 370/248
(58) Field of Search .................. 370/221, 222, 370/223, 224, 252, 242, 216, 248, 249, 503, 509

(56) References Cited

U.S. PATENT DOCUMENTS

| 5,265,096 A | 11/1993 | Parruck ............... 370/110.1 |
|---|---|---|
| 5,555,248 A | 9/1996 | Sugawara ............... 371/5.1 |
| 5,636,203 A * | 6/1997 | Shah ............... 370/244 |
| 5,781,535 A * | 7/1998 | Russ et al. ............... 370/248 |
| 6,169,754 B1 * | 1/2001 | Sugawara et al. ............... 370/535 |
| 6,452,906 B1 * | 9/2002 | Afferton et al. ............... 370/242 |
| 6,545,980 B1 * | 4/2003 | Dive et al. ............... 370/242 |
| 6,577,594 B1 * | 6/2003 | Abbas et al. ............... 370/222 |

OTHER PUBLICATIONS

US 5,699,349, 12/1997, Russ et al. (withdrawn)

European Search Report, dated Mar. 6, 2000.

* cited by examiner

*Primary Examiner*—Bob A. Phunkulh

(57) ABSTRACT

A method of transmitting in a synchronous hierarchic network system data is provided using at least a path segment between a first network element (A) and at least a second network element (F) on which a tandem connection monitoring (TC) method is established for monitoring information over the path segment. The method includes suppressing the insertion of all ones caused by the out of multiframe state subsequent to an interruption, distortion or switching operation of the signal transmission path for a predefined time interval.

10 Claims, 5 Drawing Sheets

Network with SNCP inside TC Trail

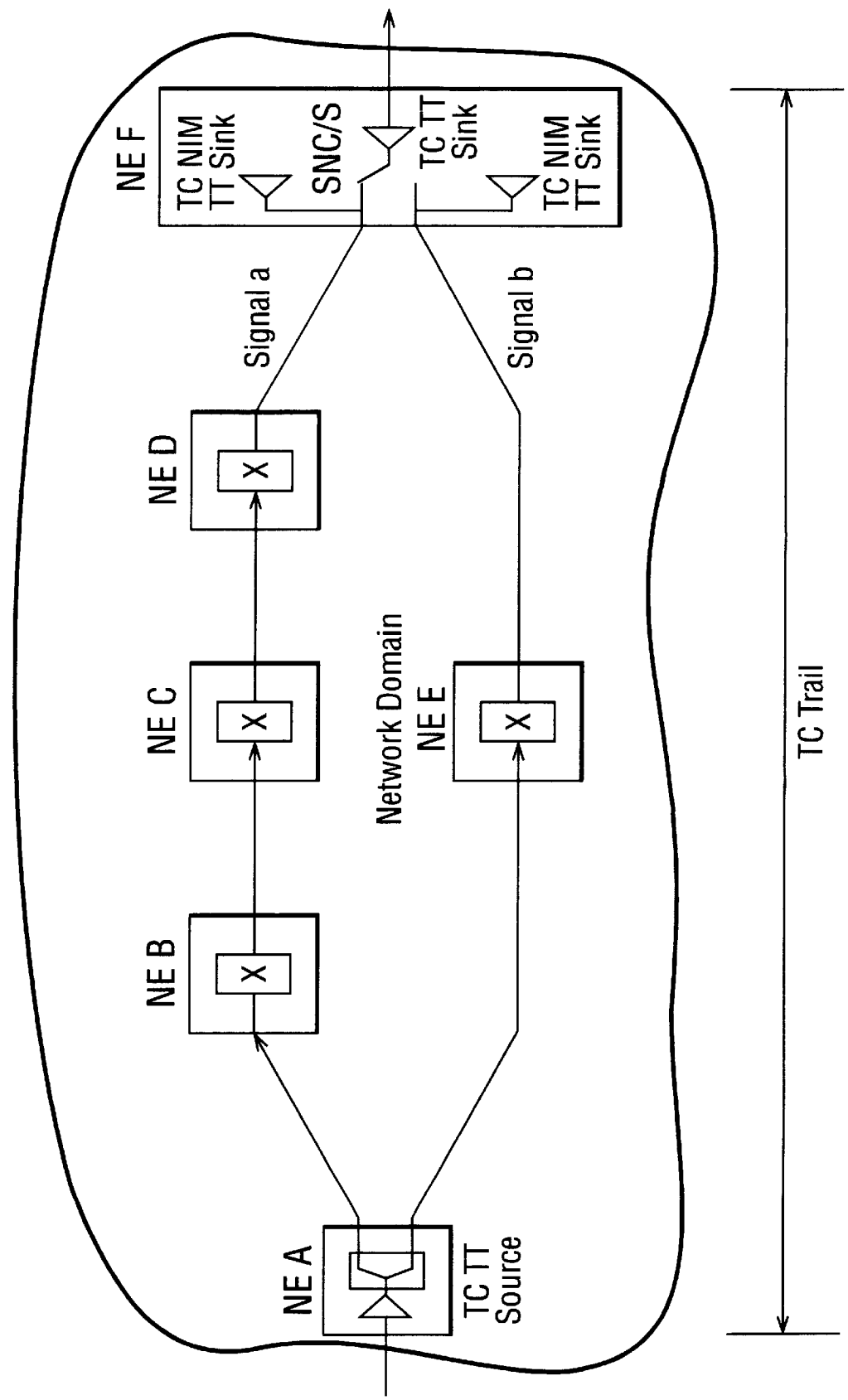
FIG. 1 Network with SNCP inside TC Trail

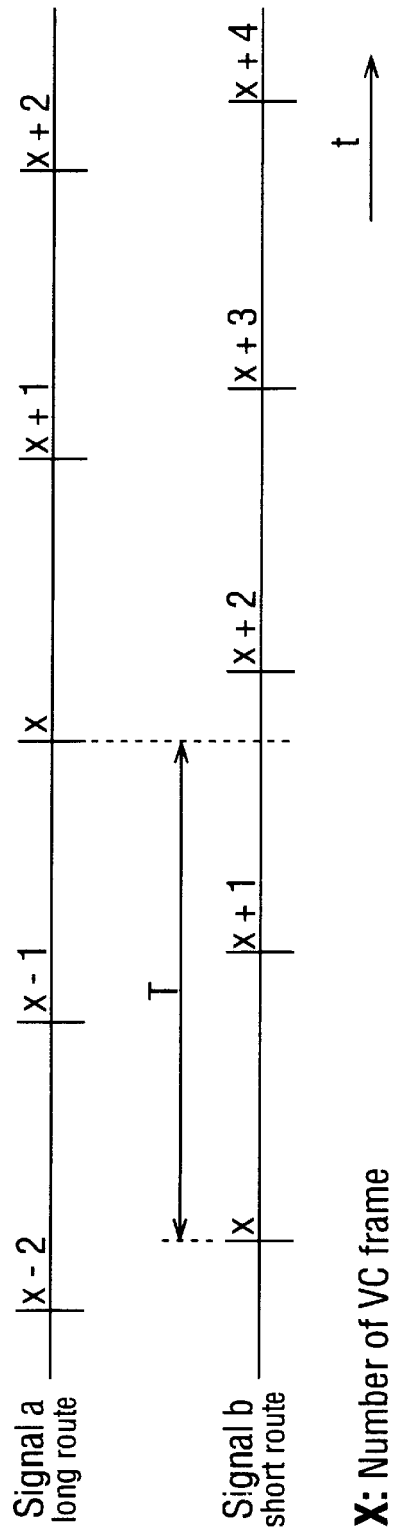
FIG. 2 Phase Relations at the Switching Point
X: Number of VC frame
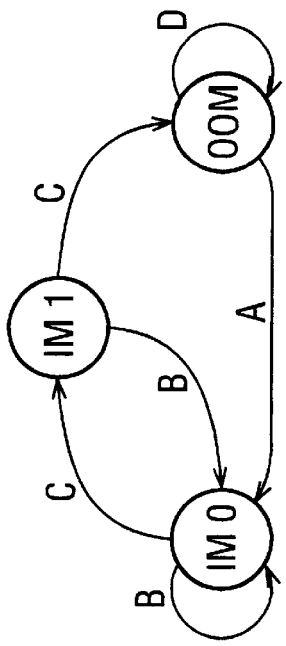
FIG. 3 State diagram 'Multiframe Alignment Process'; current implementations
A: FAS found  B: FAS found at presumed position  C: missing FAS at presumed position  D: missing FAS

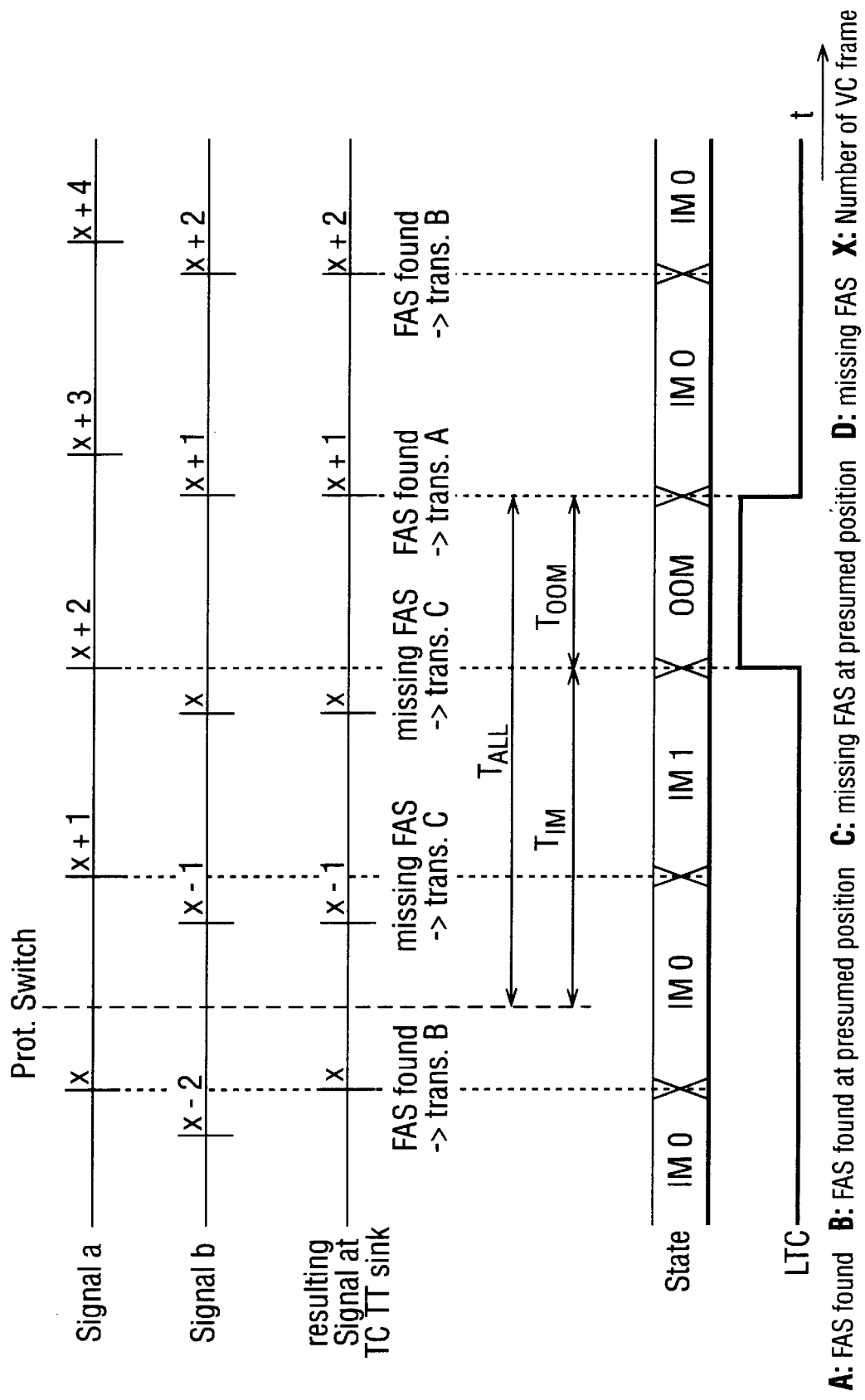

FIG. 5
N1/N2 byte bit 7 - bit 8TC multiframe structure

| Frame # | Bits 7 and 8 definition |
|---|---|
| 1-8 | Frame alignment signal: 1111 1111 1111 1110 |
| 9-12 | TC-TTI byte #0 ($1C_1C_2C_3C_4C_5C_6C_7$) |
| 13-16 | TC-TTI byte (TC-API character) #1 (0XXXXXXX) |
| 17-20 | TC-TTI byte (TC-API character) #2 (0XXXXXXX) |
| .. .. .. | .. .. .. |
| 65-68 | TC-TTI byte (TC-API character) #14 (0XXXXXXX) |
| 69-72 | TC-TTI byte (TC-API character) #15 (0XXXXXXX) |
| 73-76 | TC-RDI, ODI and Reserved (see next table) |

FIG. 6

Structure of frames # 73 - 76 of the bit 7 - bit 8 of TC multiframe

| Frame # | TC-RDI, ODI and reserved capacity | |
|---|---|---|
| | bit 7 definition | bit 8 definition |
| 73 | Reserved (default = "0") | TC-RDI |
| 74 | ODI | Reserved (default = "0") |
| 75 | Reserved (default = "0") | Reserved (default = "0") |
| 76 | Reserved (default = "0") | Reserved (default = "0") |

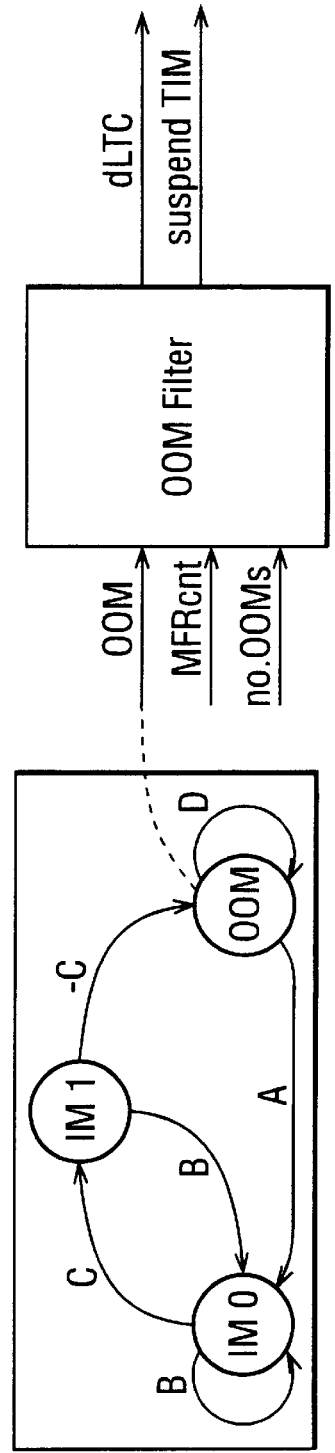

FIG. 7 Block Diagram 'OOM Filtering'

A: FAS found  B: FAS found at presumed position  C: missing FAS at presumed position  D: missing FAS
MFRcnt: Trigger for Multiframe count  no.OOMs: provisioning for number of OOM multiframes until dLTC is set

ENHANCED MULTIFRAME PROCESSING FOR TANDEM CONNECTION TRAILS WITH TRANSMISSION PROTECTION SCHEMES

CROSS-REFERENCE TO RELATED APPLICATION

This application claims priority of European Patent Application No. 99307111.7, which was filed on Sep. 7, 1999.

FIELD OF THE INVENTION

The invention relates to multiframe alignment and its consequent actions in general and especially to a multiframe alignment for tandem connection trails at Non Intrusive Monitoring (NIM) Trail Termination (TT) sink functions and for TT sink functions in a Synchronous Digital Hierarchy (SDH) and Synchronous Optical Network (SONET) system.

BACKGROUND

The problem addressed with this invention typically arises in Synchronous Digital Hierarchy (SDH) and Synchronous Optical Network (SONET) systems in case of protection switches within a Tandem Connection Trail. For a better understanding of SDH and SONET systems, reference is made to "Understanding of SONET/SDH", ISBN 0-9650448-2-3, Andan Publisher, New Jersey.

In the before-mentioned network system a tandem connection is intended to provide an administrative monitoring domain which is operating independent of the end to end path. Rules for the establishment of a tandem connection trail are defined in ETSI EN 300 417-4-1 and ITU-T G.783.

The operation and also the establishment of a tandem connection trail shall influence the rest of the network system as less as possible. Under certain circumstances (i.e. if switching actions are performed within a tandem connection trail), current Tandem Connection Monitoring (TCM) implementations according to the current versions of the standards unnecessarily enlarge signal disturbances.

Accordingly, there is a need to reduce the influence of protection switches within a tandem connection trail in a Synchronous Digital Hierarchy (SDH) or in a Synchronous Optical Network (SONET) System by avoiding enlargements of signal disturbances caused by protection switches.

SUMMARY OF THE INVENTION

An enhanced multiframe processing method and synchronous hierarchic network system optimized for the application with transmission protection schemes achieves the invention.

In current implementations the loss of the aligned signal reception resulting in an out of multiframe (OOM) signal transmission state subsequent to an interruption, distortion or switching operation of the signal transmission path leads to the detection of a Loss of Tandem Connection defect (dLTC) accompanied with an insertion of all ones as consequent action for the dLTC defect. This all ones insertion results in an undue interruption of the signal. The method of this invention avoids the immediate reaction on the OOM state by delaying the dLTC detection in the OOM state for a predefined time interval.

BRIEF DESCRIPTION OF THE DRAWINGS

The invention is explained in more detail below and reference is made to the attached drawings in which it is shown in FIG. 1 a network comprising a tandem connection trail with a protection mechanism called "sublayer monitored sub-network connection protection" (SNC/S), FIG. 2 phase relations of two subnetwork connections at the switching point, FIG. 3 state diagram 'Multiframe Alignment Process' as currently implemented, FIG. 4 dependencies between state transitions FIG. 5 N1/N2 byte bit 7 bit 8 tandem connection multiframe structure, FIG. 6 structure of frames #73–76 of the bit 7–bit 8 of a tandem connection multiframe, FIG. 7 block Diagram 'out of multiframe (OOM) Filtering'.

DETAILED DESCRIPTION

The invention is explained below based on a preferred embodiment. However, for a better understanding, a standard configuration of a network containing a tandem connection trail with possible switching is depicted in FIG. 1.

A unidirectional tandem connection trail is established between network element A (NE A) and network element F (NE F), with NE A holding the Tandem Connection source function and NE F holding the Tandem Connection sink function. The sub-network connection between NE A and NE F is protected.

The worker sub-network connection is via NE B-NE C-NE D (signal a), the protection one via NE E (signal b). The protection mechanism is "sublayer monitored sub-network connection protection" (SNC/S) which is based on the result of Tandem Connection Non-Intrusive Monitoring Trail Termination Sink functions for each of the two sub-network connections (SNCs).

In case of a protection switch operation the Tandem Connection Sink function will receive signal b instead of signal a as before.

Data signals which are routed through the network using different routes will experience different run times caused by the transfer delay on the optical fibre or the cable on the one hand and by the processing time in the different network elements on the other. Therefore the two signals will arrive with different phases at a common point (here: input of the protection switch selector at NE F).

It should be noted that 1 km of cable or optical fibre gives about 5 us of transfer delay. In a protected ring architecture, the short route can be between two adjacent nodes, whereas the long route may include all other nodes in the ring. In typical applications the phase difference may be in the range of several SDH/SONET frame lengths. In the following text, only the SDH notation (VC) is used.

FIG. 2 shows the signals a and b with a phase difference T of more than one frame length between the two signals. The signals contain the VC frames (. . . , x−2, x−1, x, x+1, x+2, . . . ). Switching from a short route to a longer route very likely results in the reception of a number of frames for a 2nd time, whereas switching from a long to a shorter route often causes a loss of a number of frames. This has certain consequences at the tandem connection sink function.

The operation of a tandem connection trail at the tandem connection sink is based on a standardized protocol. This protocol requires to check a frame alignment signal (FAS) contained in the N1/N2 bytes. The frame alignment signal (FAS) is defined as a "1111 1111 1111 1110" bit pattern in frame 1 to 8 of the 76 frames tandem connection multiframe as shown in FIGS. 5 and 6.

The process of checking a multiframe alignment is shown in FIG. 3. The multiframe alignment is found based on searching for the frame alignment signal (FAS) pattern within the bits 7 to 8 of the byte N1/N2. In the In Multiframe (IM) state, i.e. the state of a correct signal transmission, the signal is checked continuously at the presumed multiframe start position for the alignment.

However, the frame alignment is deemed to have been lost (entering Out Of Multiframe (OOM) state) when two consecutive frame alignment signal (FAS) are detected in error. Frame alignment is deemed to be recovered, i.e. entering the In Multiframe (IM) state, when one non-errored frame alignment signal (FAS) is found at any position.

A protection switch operation in front of the tandem connection sink function will likely cause a loss or duplication of N1/N2 bytes at the tandem connection sink due to the different signal delays explained above. This causes the alignment process to leave the In Multiframe state, i.e. to enter an Out Of Multiframe OOM state, as the correct length of the tandem connection multiframe structure is disturbed and the frame alignment signal (FAS) will no longer be found at the presumed multiframe start position. The out of multiframe (OOM) state then is interpreted as Loss of Tandem Connection defect (dLTC), which causes consequent actions like an all-ones insertion. As a consequence the egressing signal is overwritten with all-ones until the IM state is entered again.

FIG. 4 shows the dependencies and time sequences of the generated defect caused by the protection switch. The sequence IM ($T_{IM}$=max. 19 ms/76 ms)→OOM ($T_{OOM}$=max. 9.5 ms/38 ms)→IM needs about $T_{ALL}$=max. 28.5 ms for tandem connection signals based on a 125 microsecond VC frame (VC-4, VC-4-Xc and VC-3) and about $T_{ALL}$=max. 114 ms for tandem connection signals based on a 500 microseconds VC frame (VC-2, VC-12 and VC-11).

This means that the outgoing signal is disturbed again about $T_{IM}$ (max. 19/76 ms) after a protection switch activity that restored traffic for about $T_{OOM}$ (max. 9.5/38 ms). This disturbance would not exist if there would be no tandem connection trail established.

To avoid extended signal disturbances e.g. as the above described ones, it is necessary according to the invention to change the tandem connection sink processes such that data delay differences caused by protection switches will no longer result in a traffic interruption due to a Loss of Tandem Connection defect (dLTC).

With this approach, the inventive improvement is effective mainly in cases of manual or forced protection switches. In those cases the signal interruption caused by the switching action is very short (less than 10 ms) and the multiframe itself was not disturbed before the switching process. In cases in which the multiframe is lost before the switching action is initiated (e.g. SSF, TC-UNEQ) the advantage of the described solution is smaller.

Enhanced Multiframe Processing for TC Trails with Transmission Protection Schemes In the invention, the multiframe alignment process is changed such that data delay differences caused by switching actions do not longer result in detection of the dLTC defect with accompanied all ones insertion. To achieve this, the out of multiframe (OOM) state is detected as currently defined (see FIG. 3), but the dLTC defect is no longer directly coupled with the detection of the OOM state as it is state of the art. Therefore the implementation described by the invention does not increase the possibility of an erroneously detected frame alignment signal.

In the method of the invention the dLTC defect will not be declared before a configurable timer has expired. This timer is started as soon as the OOM state is entered and will be stopped as soon as the OOM state is left due to the detection of a new multiframe alignment signal. Only if the timer expires the dLTC defect is declared and the all ones insertion becomes active. The interval length is configurable from 0 to 3 tandem connection multiframes. If a period of zero multiframes is chosen, the whole algorithm will behave as the current implementations. Any other value bigger than zero will suppress the all ones insertion until the out of multiframe (OOM) state was active for the selected interval length.

In case of protection switches there will be transitions like IM→OOM→IM, but the out of multiframe (OOM) state is shorter than 2 TCM multiframes and the consequent action 'all-ones insertion' will therefore be suppressed, because a Loss of Tandem Connection (dLTC) signal won't be set if the timer is set appropriately. A block diagram for this solution is shown in FIG. 7.

A further inventive improvement is the suspension of the dTIM defect in case of an OOM state. The dTIM defect is declared if the received Trail Trace Identifier (TTI) does not match an expected value for three consecutive multiframes. This will most likely be the case after a switching action because the time needed to regain frame alignment is two to three multiframes. If a dLTC defect is declared, it takes three more undisturbed multiframes with matching Trail Trace Identifier before the defect is cleared. As the consequence of the dTIM defect is an all-ones insertion, three multiframes are overwritten during the realignment process.

If the dTIM detection is suspended during the OOM state, no dTIM defect is detected due to the protection switch action. Therefore there is no extension of the signal interruption caused by the all-ones insertion, which is a consequent action to a detected dTIM defect.

What is claimed is:

1. A method of transmitting data in a synchronous hierarchic network system comprising at least a signal transmission path segment between a first network element and a second network element, said method comprising:

establishing a tandem connection monitoring method for monitoring transmission of information over said path segment, and means for suppression of the insertion of all ones caused by out of multiframe state subsequent to an alteration of the signal transmission path for a predefined interval, detecting an out of multiframe state in response to an interruption, distortion or switching operation on said path segment, starting a timer upon detection of an out of multiframe state, and upon the timer timing a predetermined time interval inserting all ones.

2. The method of transmitting data according to claim 1, wherein the detection of the Loss of Tandem Connection defect (dLTC) with its accompanied subsequent all ones insertion is decoupled from the detection of an out of multiframe signal transmission state.

3. The method of transmitting data according to claim 1, wherein a Loss of Tandem Connection defect (LTC) signal is only set if an out of multiframe (OOM) state is active for a time period which is longer than said predefined time interval.

4. The method of transmitting data according to claim 1, wherein the length of the predefined time interval is configurable from 0 to 3 tandem connection multiframes.

5. The method of transmitting data according to claim 3, wherein a trail trace identifier (TTI) mismatch detection process is suspended during the Out of Multiframe (OOM) state.

6. A synchronous hierarchic network system, especially adapted to data transmission, comprising at least a path segment between a first network element and a second network element on which a tandem connection monitoring method is established for monitoring information over said path segment, means for detecting an out of multiframe state in response to an interruption, distortion or switching operation on said path segment, a timer which starts timing upon detection of an out of multiframe state, and means for inserting all ones upon the timer timing a predetermined time interval.

7. The synchronous hierarchic network system according to claim 6 comprising means for suspension of the trace identifier mismatch detection process during an OOM state.

8. The synchronous hierarchic network system according to claim 6, wherein the detection of the Loss of Tandem Connection defect (LTC) defect with its accompanied subsequent all ones insertion is decoupled from the detection of an out of multiframe signal transmission state.

9. The synchronous hierarchic network system according to claim 6, wherein a Loss of Tandem Connection defect (dLTC) signal is only set if an out of multiframe (OOM) state is active for a time period which is longer than a predefined time interval.

10. The synchronous hierarchic network system according to claim 6, wherein the length of the predefined time interval is configurable from 0 to 3 tandem connection multiframes.

* * * * *